Figure 1:
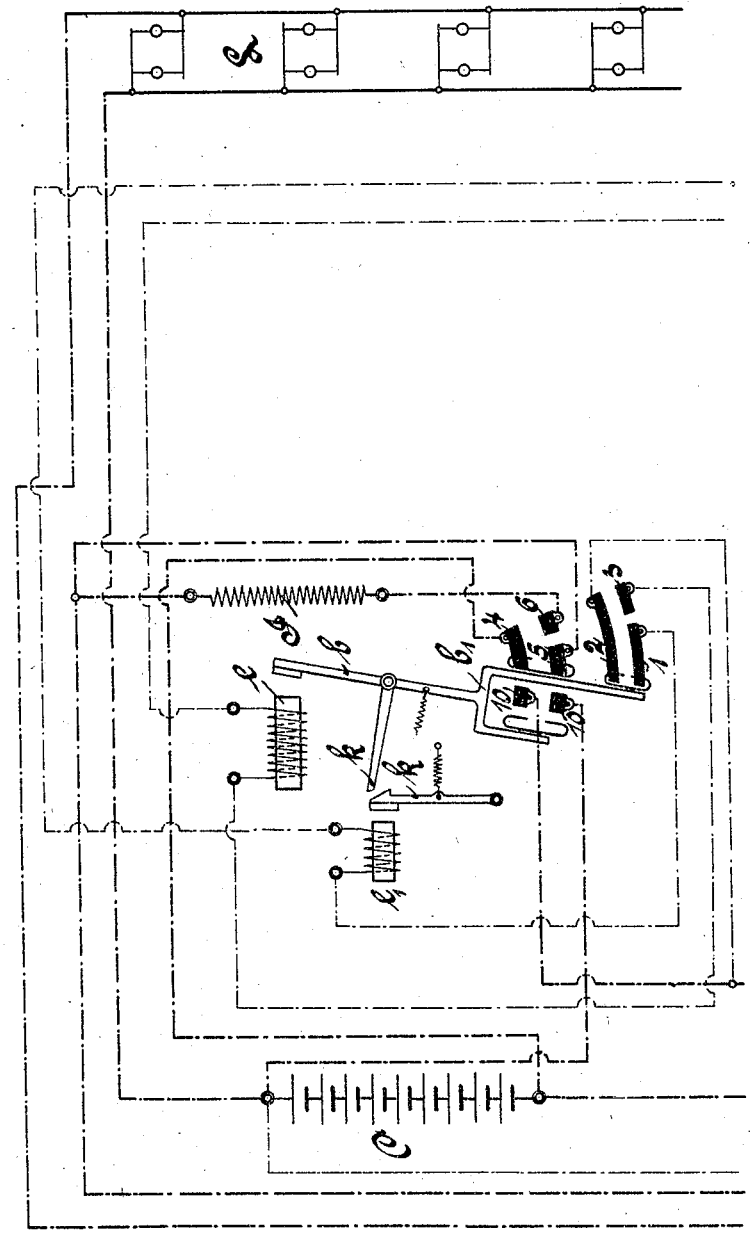

No. 774,701. PATENTED NOV. 8, 1904.
F. W. SCHNEIDER.
ELECTRIC ILLUMINATING ARRANGEMENT FOR RAILWAY VEHICLES.
APPLICATION FILED SEPT. 15, 1902.
NO MODEL. 6 SHEETS—SHEET 1.

Witnesses
E. Warrener
[signature]

Inventor
Friedrich Wilhelm Schneider
By [signature]
Attorneys.

No. 774,701. PATENTED NOV. 8, 1904.
F. W. SCHNEIDER.
ELECTRIC ILLUMINATING ARRANGEMENT FOR RAILWAY VEHICLES.
APPLICATION FILED SEPT. 15, 1902.
NO MODEL. 6 SHEETS—SHEET 2.

No. 774,701. PATENTED NOV. 8, 1904.
F. W. SCHNEIDER.
ELECTRIC ILLUMINATING ARRANGEMENT FOR RAILWAY VEHICLES.
APPLICATION FILED SEPT. 15, 1902.
NO MODEL. 6 SHEETS—SHEET 3.

No. 774,701. PATENTED NOV. 8, 1904.
F. W. SCHNEIDER.
ELECTRIC ILLUMINATING ARRANGEMENT FOR RAILWAY VEHICLES.
APPLICATION FILED SEPT. 15, 1902.
NO MODEL. 6 SHEETS—SHEET 6.
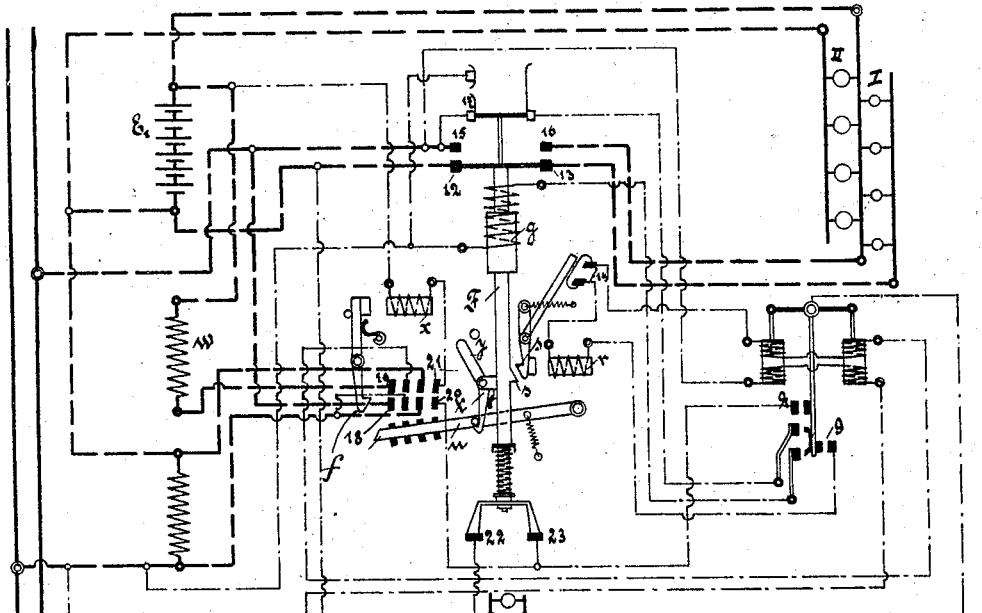
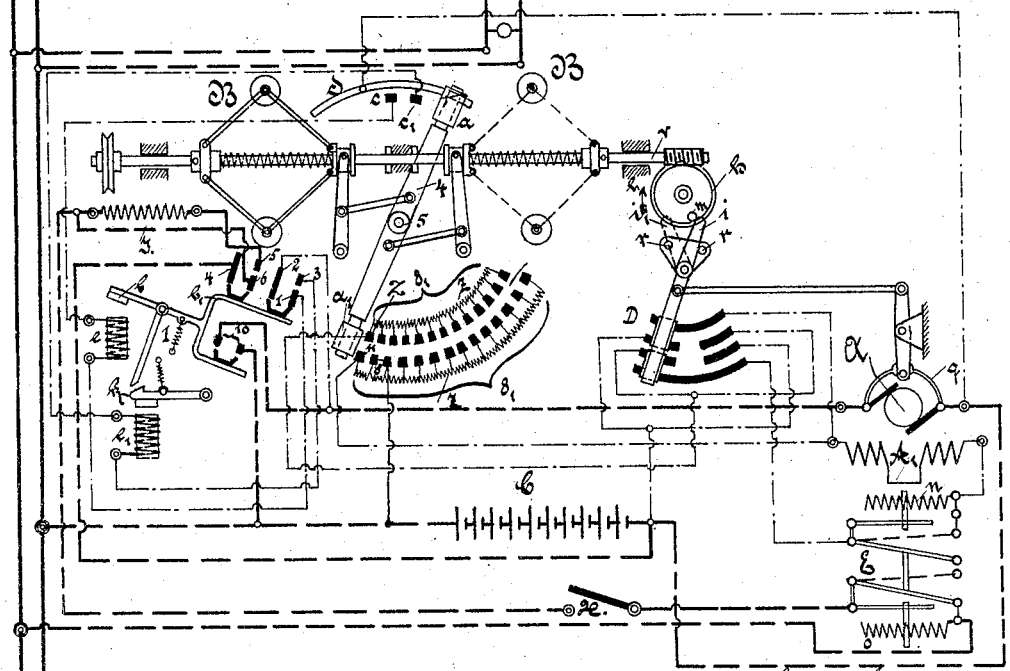
Fig. 6.
Witnesses Inventor
Friedrich W. Schneider No. 774,701.

Patented November 8, 1904.

UNITED STATES PATENT OFFICE.

FRIEDRICH WILHELM SCHNEIDER, OF FRANKFORT-ON-THE-MAIN, BOCK-ENHEIM, GERMANY, ASSIGNOR TO SOCIETY OF VOIGT & HAEFFNER, ACTIEN GESELLSCHAFT, OF FRANKFORT-ON-THE-MAIN, GERMANY.

ELECTRIC ILLUMINATING ARRANGEMENT FOR RAILWAY-VEHICLES.

SPECIFICATION forming part of Letters Patent No. 774,701, dated November 8, 1904.

Application filed September 15, 1902. Serial No. 123,514. (No model.)

*To all whom it may concern:*

Be it known that I, FRIEDRICH WILHELM SCHNEIDER, a subject of the German Emperor, residing and having my post-office address at 2 Falkstrasse, Frankfort-on-the-Main, Bockenheim, Germany, have invented certain new and useful Improvements in Electric Illuminating Arrangements for Railway-Vehicles, of which the following is a specification.

This invention relates to an arrangement for electrically lighting railway-trains in which a dynamo driven in the known manner by an axle supplies the necessary electric current for the whole train or for single cars, an accumulator battery or batteries being provided to supply the lamps with current while the train is at a standstill or in case the dynamo breaks down. In this connection the control of the current, the arrangement of parallel connections, and the charging of the battery present certain difficulties which have to be overcome. Arrangements of this kind are already known. Thus, for instance, it has been attempted to secure uniform pressure by elastically suspending the dynamo in such a manner that when a certain efficiency was overstepped the belt slipped, and the pressure was thus maintained within certain limits. Connections were made at certain speeds by an ordinary centrifugal governor. The latter, however, was considerably affected by vibration and the like and either made or unmade the connections too early or too late or broke them again when they had been made, and so on. (Stone's system.) In other cases the control was affected by means of contact instruments. In most cases the circuit-closers were operated by relays or by means of ordinary centrifugal governors. All these systems had the disadvantage of being very much interfered with by vibration and subject to frequent breakdowns and to wear of apparatus through constant working, and they also produced unsteady light. (Vicarino's, Dick's, and Kull's systems.)

In the present invention uniformity of pressure is obtained by purely mechanical means.

The invention is illustrated in the annexed drawings, in which—

Figure 2:
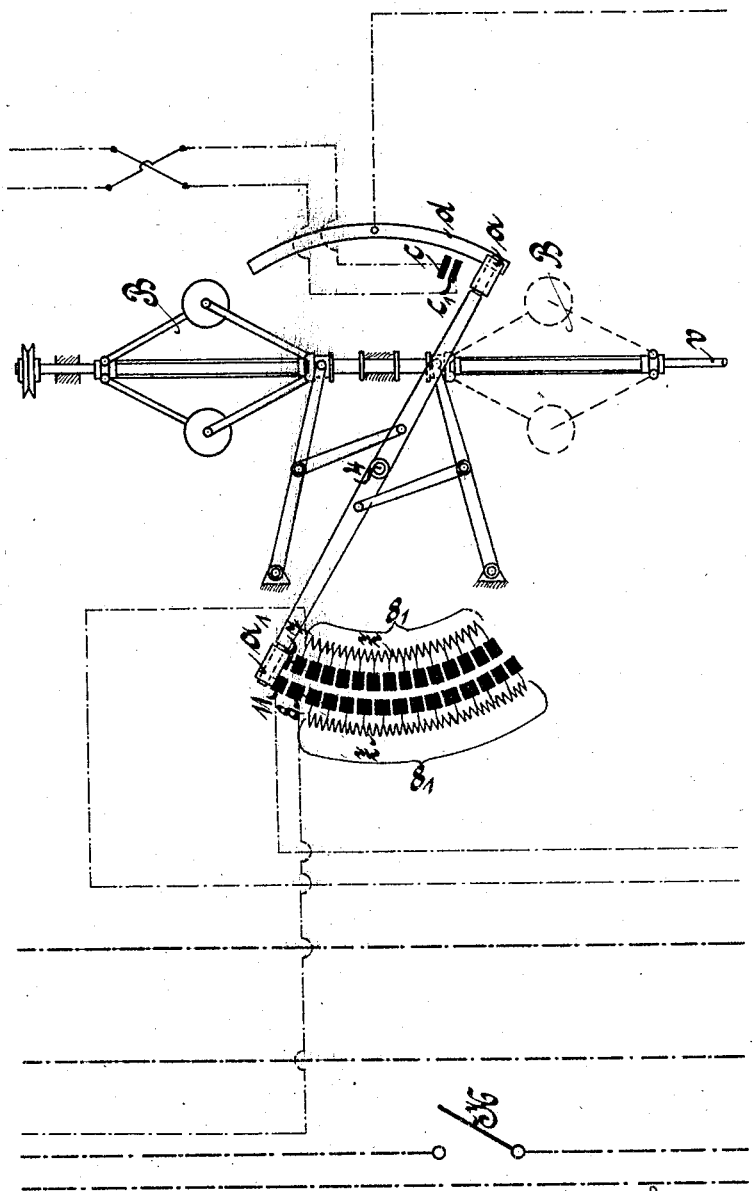
Figure 3:
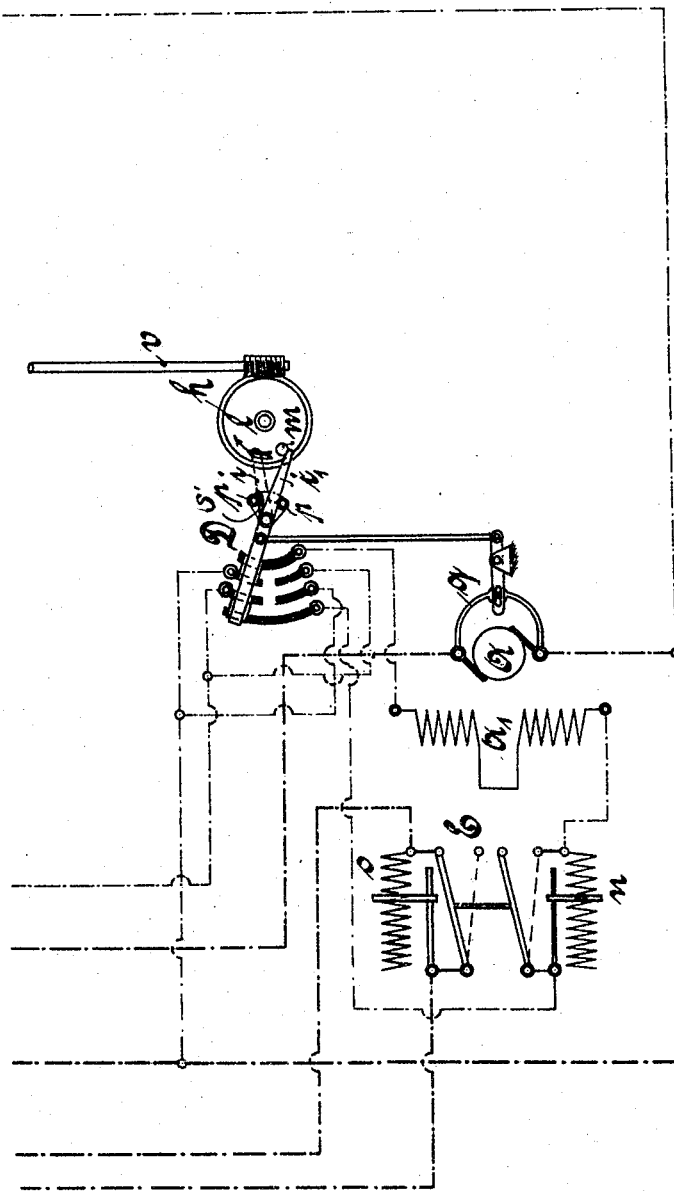
Figure 4:
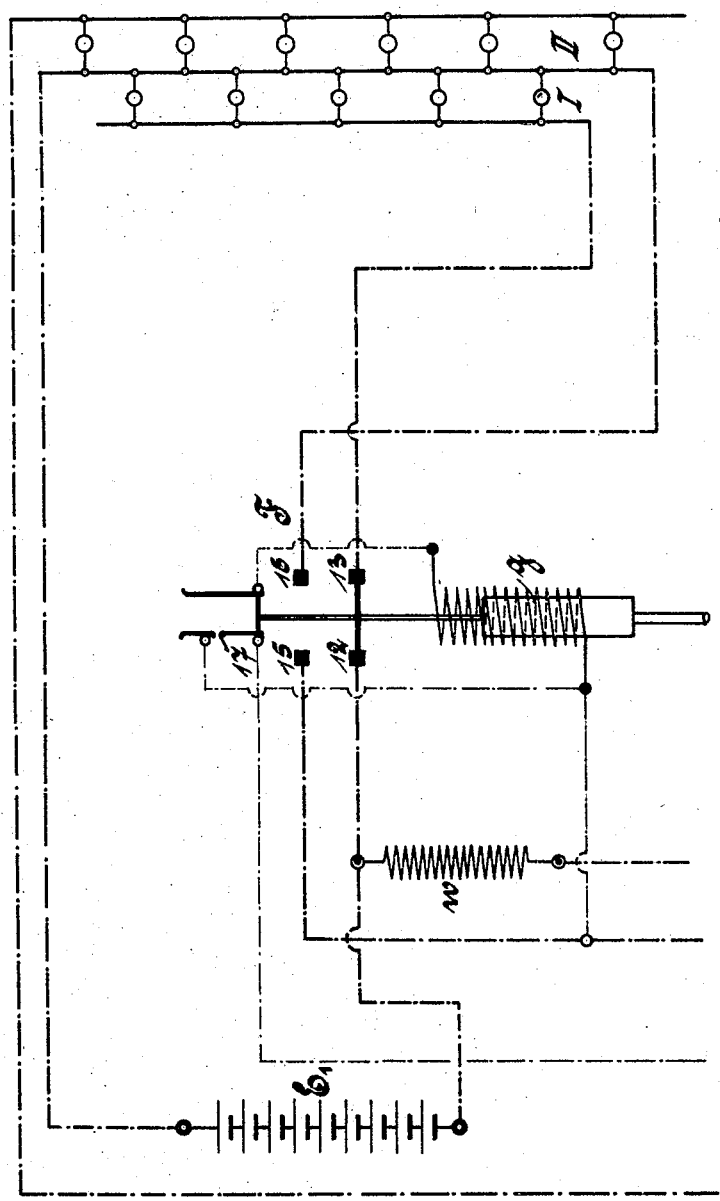
Figure 5:
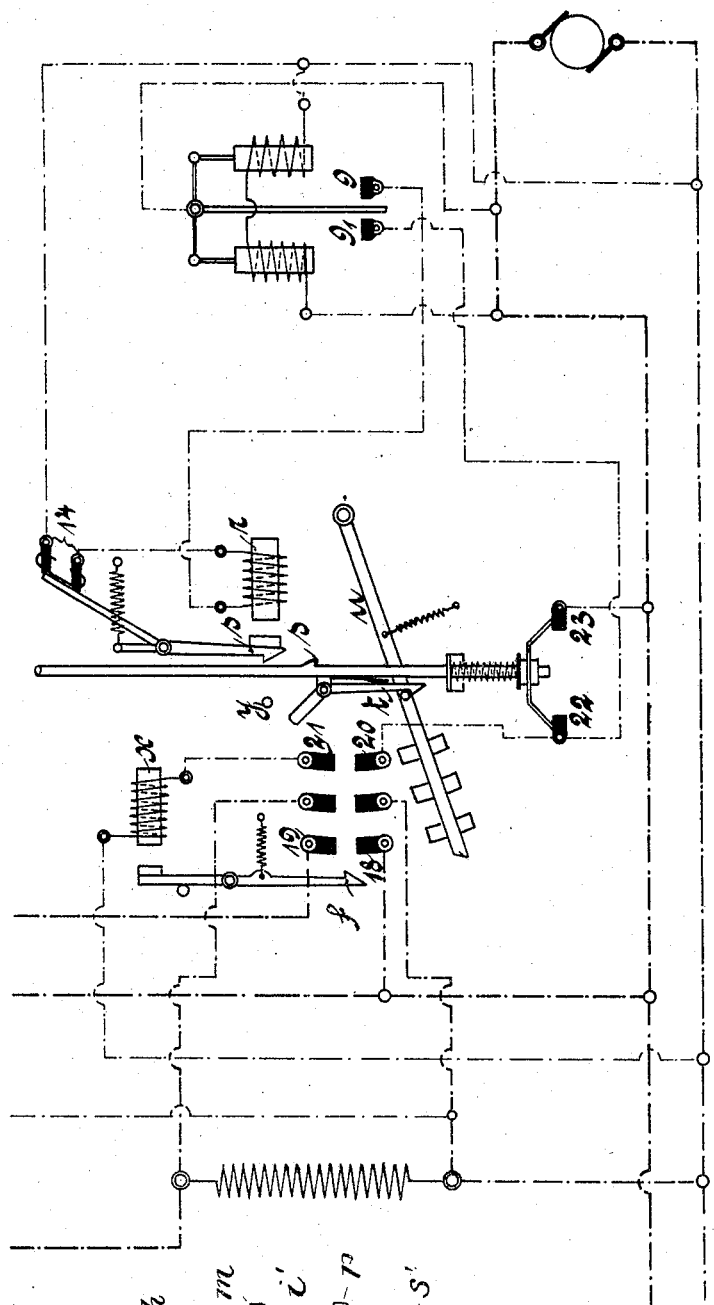

Figure 1 is an enlarged diagrammatic view of the locking-lever and its connections. Fig. 2 is an enlarged diagrammatic representation of the governor and its connections. Fig. 3 is an enlarged diagrammatic view of the reversing device and its connections. Figs. 4 and 5 are enlarged diagrammatic views of the car-switches, batteries, and connections; and Fig. 6 is a general diagrammatic view showing the arrangement and relations of all of the parts.

The arrangement is controlled by a compound governor which is not affected by vibration and the like. The said governor comprised two centrifugal governors B, placed on one spindle, Figs. 1 to 3, and acting in opposite directions, their oscillating masses being at an angle of ninety degrees to each other. These governors B are adapted to operate a rotatable lever 4 in such a manner as to assist each other and move the said lever, external influences being entirely eliminated. The lever 4, which is moved by the compound governor according to the speed of the car, carries at one end a contact-roller $a$ and at the other end a similar roller $a_1$. When at a certain speed the lever 4 is moved so as to make contact at 7 and 8 by means of the roller $a_1$, the shunt-coil $A_1$ of the dynamo A is placed in circuit with the battery C. The roller $a$, immediately upon the contacting at 7 and 8, makes contact at $c$ and $d$, whereby the solenoid $e$ is energized and operates the lever $b\,b$, which is then locked by the catch $k$. The dynamo is thus by means of the contact 10 placed in parallel connection with the battery and by means of the contacts 4, 5, and 6 with the lamps L with an intermediate resistance J, which absorbs the difference between the discharging-pressure and the dynamo-pressure. When the speed increases, the roller $a'$ is moved over the contacts 8 and the pressure is kept uniform by placing the resistance Z in the exciting-circuit. If the speed decreases, the reverse takes place. When the roller $a$ moves back over the contact $c_1$ and connects the latter with $d$, the solenoid $e_1$ is energized and the catch $k$ is caused to release the lever $b$ $b_1$, whereupon the latter returns to its former position. The dynamo is thus disconnected, and the resistance in front of the lamps is short-circuited. By means of the contacts 2 1 and 2 3, respectively, the lever $b$ open-circuits at the end of its respective movements the solenoid which has operated it, so that no sparks are produced by induction at the contacts $c$ and $c$. The solenoid-current is interrupted immediately after it has done its work, and contact is prepared for the other magnet. When the dynamo has been disconnected, the shunt-circuit is broken by means of the roller $a$ and the shunt-coil short-circuited by the contacts 7 and 11.

For the purpose of obtaining a current of similar direction whether the train is traveling forward or backward an automatic reversing device is used. When the direction of travel is reversed, the reversing-arm D is moved to the right or left by a tappet-wheel $h$, operated by the spindle $r$ of the governor, the object being attained by reversing the exciting-current or the main current. The tappet-wheel rotates between two arms $i$ and $l_1$. These arms bear to the left hand and right hand, respectively, being elastically held against studs $p$ on the reversing-lever D by springs $s$ and $s_1$, and each arm is adapted to move the lever in one direction and to yield freely in the other direction. If the wheel rotates in the direction of the arrow $l$, the tappet $m$ moves forward the arm $i$, which becomes operative in the right-hand direction and reverses the lever D. Since the arm $i_1$ is inoperative in that direction, the tappet $m$ pushes it aside each time and slides past. If the wheel rotates in the other direction, the arm $i_1$ is moved, and the arm $i$ yields. Since when the direction of rotation is reversed in the dynamo the neutral zone is displaced, the rocker $q$ is adjusted at the same time.

All resistances are so calculated that during the parallel connection the dynamo electromotive force corresponds to a single-cell electromotive force of 2.2 volts from the battery.

If the battery which is only discharged to a very slight extent during normal working is to be charged at intervals of from eight to ten days, this can be done during the day-time or while the lamps are in use. In the latter case a resistance $n$ normally in circuit is short-circuited by means of a two-pole switch E in order to slightly increase the pressure. To absorb this extra pressure, a resistance $o$ is at the same time put into circuit in front of the lamps.

In order that a complete apparatus need not be provided in each car and that one main apparatus can serve the entire train, automatic switches and small batteries must be placed in the other cars, Figs. 4 and 5. In order to suffice for the fall of potential throughout the train, the said batteries must, however, have a potential of at least one hundred and ten volts and comprise cells. Batteries of this kind are expensive, difficult to insulate, and require much labor. For this reason two groups of lamps are provided in each car, the group II comprising lamps which take a normal number of watts and large electromotive force, (one hundred and ten volts,) whereas the lamps of group I take a small number of watts and very low electromotive force. The former group is fed by the main generator, the latter by the battery $E_1$. For this reason the said battery can be considerably smaller and need only comprise a very small number of cells, so that the cost of their installation is reduced and their maintenance rendered considerably more simple.

The action of the controlling apparatus is as follows: If the potential at the dynamo A falls or the current is entirely interrupted by the uncoupling of cars or the like, a contact-voltmeter G, excited by the dynamo A, makes a connection at the contact $g$, whereby the solenoid $r$ is energized by the battery $E_1$. This solenoid attracts the catch S, thereby unlocking the circuit-breaker F and breaking its own circuit at contact 14. The circuit is thus broken at the contacts 15 and 16, and the group II of lamps is disconnected, while connection is made at the contacts 12 and 13, thereby connecting the group I of the lamps with the battery $E_1$. The downward movement of the circuit-breaker F is caused by its own weight. As soon as the main station (the dynamo A) delivers again a current of sufficient potential the solenoid $g$ will be energized from the dynamo A with such an intensity that the solenoid $g$ will again move the circuit-breaker F upward, thereby breaking its own circuit at the contact 17, the circuit-breaker F being locked by the catch S in this position without operation of the solenoid $g$. At the same time that the circuit-breaker F is switched in the lever $u$ will be switched in by means of the hook $t$, connected to the breaker F. By the lever $u$ contact is made at 18 and 19, and the battery $E_1$ will be recharged after each discharge, a resistance $w$ being inserted in the circuit. At the same time contact is also made at 20 and 21 for the solenoid $x$.

Fig. 6 differs from Fig. 5 in that an additional contact is provided, so that the circuit of the battery $E_1$ may be broken by means of the solenoid $x$ as soon as the battery is charged up to a definite value. There has therefore been provided a second winding, which is automatically energized directly from the battery $E_1$ simultaneously with the switching in of the lever $u$. It will thus be seen that Fig. 6 is merely a modification of the device illustrated in Fig. 5.

When the charging has been completed, the contact-voltmeter makes contact at $9_1$ and energizes the magnet $x$, whereby the hook $f$ is moved, and the lever $u$ is released and interrupts the charging-current and breaks at 20 21 the solenoid-circuit made by the contact-voltmeter at $9_1$, so that a relay is rendered unnecessary.

In case in the absence of current from the dynamo the hook $f$ is released and drops into engaging position before the battery is charged—that is to say, before the lever $u$ is released—F when dropped makes contact at 22 23, and by this means also the magnet $x$ is energized and causes the lever $u$ to be released. The energizing-circuit thus made is broken at 20 21, so that no useless discharge is left on the circuit. A mechanical coupling device is connected to the main switch H of the dynamo, Figs. 1, 2, and 3, in such a manner that the dynamo stops when the said switch is opened and is started when the switch is closed.

What I claim is—

1. Apparatus for the electric illumination of railway-trains, the connecting and regulating parts of which are controlled by means of a centrifugal governor, comprising in combination a dynamo, a governor, a shaft adjusted by the governor according to the speed of the train, a rheostat an arm carrying two movable contact-rollers $a\ a$, and adapted to be moved by the said shaft, one of said rollers $a$ at a certain speed placing the shunt-circuit exciter in the battery-circuit and on the occurrence of further variations passing over said rheostat, placing in circuit in the known manner successive resistance, the other roller $a_1$, sliding over a pair of contacts immediately after the shunt-circuit has been excited, an electromagnet $e$ in circuit with said last-mentioned contacts and with the dynamo, a contact-arm $b\ b_1$ provided with fixed contacts adapted to be placed in circuit by said electromagnet, means for locking said contact-arm in its closed position, circuit of electromagnet $e$ adapted to be thereupon broken, an unlocking-magnet $e_1$ adapted when the inferior limit of speed is passed to be excited by the contact-roller $a$ in moving back and adapted thereupon to release the contact-arm $b\ b_1$ in order that it may move back into its disconnecting position breaking circuit of the magnet $e_1$ and again adjusting contact for the closing of circuit of magnet $e$.

2. Apparatus for the electric illumination of railway-trains, the connecting and regulating parts of which are controlled by means of a centrifugal governor, comprising in combination a dynamo, a balanced system of governors, a shaft adjusted by the governor according to the speed of the train, a rheostat, an arm carrying two movable contact-rollers $a\ a$, and adapted to be moved by said shaft, one of said rollers $a$ at a certain speed placing the shunt-circuit exciter in the battery-circuit and on the occurrence of further variations passing over said rheostat placing in circuit in the known manner successive resistances, the other roller $a$, sliding over a pair of contacts immediately after the shunt-circuit has been excited, an electromagnet $e$ in circuit with said last-mentioned contacts and with the dynamo, a parallel contact-arm $b\ b_1$ provided with fixed contacts, adapted to be placed in circuit by said electromagnet, means for locking said contact-arm in its closed position, circuit of electromagnet $e$ adapted to be thereupon broken, an unlocking-magnet $a_1$ adapted when the inferior limit of speed is passed to be excited by the contact-roller $a$ in moving back, and adapted thereupon to release the contact-arm $b\ b_1$ in order that it may move back into its disconnecting position breaking the circuit of magnet $e_1$ and again adjusting contact for the closing of circuit of magnet $e$.

3. Apparatus for the electric illumination of railway-trains comprising in combination a dynamo, a governor, means for rotating the governor in conformity with the speed and direction of movement of the train, a reversing-switch connected to the current-collector of the dynamo and means operated by the governor-shaft for reversing said switch.

4. Apparatus for the electric illumination of railway-trains comprising in combination a dynamo, a governor, means for rotating the governor in conformity with the speed and direction of movement of the train, a reversing-switch connected to the current-collector of the dynamo and means operated by the governor-shaft for reversing said switch, said means comprising a rotary tappet-wheel, two levers $i\ i_1$ having a movement on the switch positively limited each in an opposite direction, to coöperate with said tappet alternatively substantially as set forth.

5. Apparatus for the electric illumination of railway-trains, the connecting and regulating parts of which are controlled by means of a centrifugal governor, comprising in combination a dynamo, a governor, a shaft adjusted by the governor according to the speed of the train, a rheostat, an arm carrying two movable contact-rollers $a\ a$ and adapted to be moved by said shaft, one of said rollers $a$ at a certain speed placing the shunt-circuit exciter in the battery-circuit and on the occurrence of further variations passing over said rheostat, placing in circuit in the known manner successive resistances, the other roller $a_1$ sliding over a pair of contacts immediately after the shunt-circuit has been excited, an electromagnet $e$ in circuit with said last-mentioned contacts and with the dynamo, a contact-arm $b\ b_1$ provided with fixed contacts, adapted to be placed in circuit by said electromagnet means for locking said contact-arm in its closed position, circuit of electromagnet $e$ adapted to be thereupon broken, an unlocking-magnet $e_1$ adapted when the inferior limit of speed is passed to be excited by the contact-roller $a$ in moving back, and adapted thereupon to release the contact-arm $b\ b_1$ in order that it may move back into its disconnecting position breaking circuit of the magnet $e_1$ and again adjusting contact for the closing of circuit of magnet $e$, together with apparatus for periodically charging the battery comprising a bipolar switch, a resistance $n$ in a shunt-circuit adapted to be short-circuited thereby, and a normally short-circuited resistance $o$ in front of the lamps, adapted to be brought into circuit by said switch, a clockwork mechanism, a table of charging dates, the clockwork mechanism being adapted to be wound up and set in motion when the circuit is adjusted for charging and capable after a certain space of time of readjusting the bipolar switch and moving the date-disk by one field so that the next date comes into view.

6. Apparatus for the electric illumination of railway-trains, the connecting and regulating parts of which are controlled by means of a centrifugal governor, comprising in combination a dynamo, a governor, a shaft adjusted by the governor according to the speed of the train, a rheostat, an arm carrying two movable contact-rollers $a\ a$, and adapted to be moved by said shaft one of said rollers $a$ at a certain speed placing the shunt-circuit exciter in the battery-circuit and on the occurrence of further variations passing over said rheostat, placing in circuit in the known manner successive resistances, the other roller $a$, sliding over a pair of contacts immediately after the shunt-circuit has been excited, an electromagnet $e$ in circuit with said last-mentioned contacts and with the dynamo, a contact-arm $b\ b_1$ provided with fixed contacts, adapted to be placed in circuit by said electromagnet, means for locking said contact-arm in its closed position, circuit of electromagnet $e_1$ adapted when the inferior limit of speed is passed to be excited by the contact-roller $a$ in moving back, and adapted thereupon to release the contact-arm $b\ b_1$ in order that it may move back into its disconnecting position breaking circuit of the magnet $e_1$ and again adjusting contact for the closing of circuit of magnet $e$, together with a reserve battery, and two groups of lamps, one of which groups is adapted to the necessary high pressure of the main apparatus and the normal number of watts, the other group, being adapted for a very low pressure and small number of watts and a magnetically-operated circuit-controlling device by which the smaller group of lamps connected to the battery is placed out of circuit while current is supplied by the main generator.

7. In apparatus for the electric illumination of railway-trains, the combination of a main generator, a series of lamps, connection for operating said lamps from said main generator, another series of lamps of lower voltage, a battery for the supply of current to said latter series of lamps of lower voltage, a battery for the supply of current to said latter series of lamps, a magnetically-operated circuit-controller for cutting the lamps of lower voltage out of circuit when current is supplied by the main generator and simultaneously effecting a connection for charging the battery, means for cutting said battery out of circuit when the charging is complete and means for cutting the circuit-controller out of circuit on the severance of the train whereby the circuit of the lower-voltage lamps is reestablished.

8. Apparatus for the electric illumination of railway-trains, the connecting and regulating parts of which are controlled by means of a centrifugal governor, comprising in combination a dynamo, a governor, a shaft adjusted by the governor according to the speed of the train, a rheostat an arm carrying two movable contact-rollers $a\ a$ and adapted to be moved by said shaft, one of said rollers $a$ at a certain speed placing the shunt-circuit and on the occurrence of further variations passing over said rheostat, placing in circuit in the known manner successive resistance, the other roller $a_1$ sliding over a pair of contacts immediately after the shunt-circuit has been excited, an electromagnet $a$ in circuit with said last-mentioned contacts and with the dynamo, a contact-arm $b\ b_1$ provided with fixed contacts adapted to be placed in circuit by said electromagnet, means for locking said contact-arm in its closed position, circuit of electromagnet $e$ adapted when the inferior limit of speed is passed to be excited by the contact-roller $a$ in moving back, and adapted thereupon to release the contact-arm $b\ b_1$ in order that it may move back into its disconnecting position breaking circuit of the magnet $e_1$ and again adjusting contact for the closing of circuit of a magnet $e$ and a main switch so connected to a driving coupling for the dynamo that when the said switch is closed the said coupling is closed, and when the switch is open the coupling is disconnected.

In testimony whereof I have signed my name to this specification in the presence of two subscribing witnesses.

FRIEDRICH WILHELM SCHNEIDER.

Witnesses:
  FRANZ HASSLACHER,
  ERWIN DIPPEL.